(12) United States Patent
Cao et al.

(10) Patent No.: US 10,993,275 B2
(45) Date of Patent: Apr. 27, 2021

(54) METHOD AND APPARATUS FOR MANAGING COMMUNICATION LINKS WITH A PLURALITY OF TRAFFIC NODES

(71) Applicant: HUAWEI TECHNOLOGIES CO., LTD., Guangdong (CN)

(72) Inventors: Hanwen Cao, Munich (DE); Sandip Gangakhedkar, Munich (DE); Steffen Schieler, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/546,214

(22) Filed: Aug. 20, 2019

(65) Prior Publication Data

US 2019/0387558 A1    Dec. 19, 2019

Related U.S. Application Data

(63) Continuation of application No. PCT/EP2017/053863, filed on Feb. 21, 2017.

(51) Int. Cl.
*H04W 76/14*       (2018.01)
*H04W 76/15*       (2018.01)
(Continued)

(52) U.S. Cl.
CPC .............. *H04W 76/14* (2018.02); *H04W 4/40* (2018.02); *H04W 8/005* (2013.01);
(Continued)

(58) Field of Classification Search
CPC ....... H04W 76/14; H04W 76/15; H04W 4/40; H04W 12/003; H04W 8/005;
(Continued)

(56) References Cited

U.S. PATENT DOCUMENTS

2012/0263036 A1    10/2012   Barclay et al.
2014/0162544 A1*    6/2014   Edge .................. H04L 12/1868
                                                         455/3.01
(Continued)

FOREIGN PATENT DOCUMENTS

CN       105122312 A    12/2015
CN       105991759 A    10/2016
DE    102014001038 A1     7/2015

OTHER PUBLICATIONS

Anonymous, "Federal Register. Federal Motor Vehicle Safety Standards; V2V Communications; Proposed Rule", Federal Register / vol. 82, No. 8 / Thursday, Jan. 12, 2017, Department of Transportation National Highway Traffic Safety Administration, pp. 3601-4148, XP002775985.

(Continued)

*Primary Examiner* — Thai Nguyen
(74) *Attorney, Agent, or Firm* — Womble Bond Dickinson (US) LLP

(57) ABSTRACT

An apparatus for managing communication links with a plurality of traffic nodes registered with a radio network configured to receive a request from a first traffic node to establish a communication link with a second traffic node, which is one of the plurality of traffic nodes. The apparatus further receives, from the first traffic node, object description information associated with the request, compares the object description information with stored information relating to at least some of the plurality of traffic nodes, determines, based on the comparison, a likelihood that the object description information pertains to the second traffic node and decides, based on the determination, whether to grant the request. The apparatus is able to act as a traffic node manager for the radio network and could be a network node (Continued)

such as a Base Station or Base Transceiver Station or a dedicated vehicle identity manager for example.

17 Claims, 13 Drawing Sheets

(51) Int. Cl.
| | |
|---|---|
| H04W 4/40 | (2018.01) |
| H04W 12/00 | (2021.01) |
| H04W 8/00 | (2009.01) |
| H04W 72/08 | (2009.01) |
| H04W 72/12 | (2009.01) |
| H04W 92/12 | (2009.01) |
| H04W 92/20 | (2009.01) |

(52) U.S. Cl.
CPC ....... *H04W 12/003* (2019.01); *H04W 72/087* (2013.01); *H04W 72/1242* (2013.01); *H04W 76/15* (2018.02); *H04W 92/12* (2013.01); *H04W 92/20* (2013.01)

(58) Field of Classification Search
CPC ........... H04W 72/087; H04W 72/1242; H04W 92/12; H04W 92/20; H04W 12/005; H04W 12/04; H04L 63/061; H04L 2209/84; H04L 9/3226
See application file for complete search history.

(56) References Cited

U.S. PATENT DOCUMENTS

| | | | |
|---|---|---|---|
| 2014/0227997 A1* | 8/2014 | Kim | H04W 12/04031 455/410 |
| 2015/0016823 A1 | 1/2015 | Strassenburg-Kleciak | |
| 2015/0052352 A1 | 2/2015 | Dolev et al. | |
| 2015/0081201 A1* | 3/2015 | Rubin | G08G 1/161 701/301 |
| 2015/0327296 A1* | 11/2015 | Kumar | H04W 72/14 370/329 |
| 2016/0012648 A1 | 1/2016 | Fustes | |
| 2016/0277941 A1 | 9/2016 | Kim et al. | |

OTHER PUBLICATIONS

Dong Li, et al. ForeSight: Mapping Vehicles in Visual Domain and Electronic Domain. Journal: "IEEE Infocom." in IEEE Infocom. (2014). pp. 1995-2003.
ETSI TS 102 723-8 V1.1.1 (Apr. 2016), "Intelligent Transport Systems (ITS); OSI cross-layer topics; Part 8: Interface between security entity and network and transport layer", Technical Specification, European Telecommunications Standards Institute (ETSI),vol. ITS WG5, No. V1.1.1, Apr. 1, 2016, total 36 pages. XP014274084.
ETSI TS 102 940 V1.2.1 (Nov. 2016) , "Intelligent Transport Systems (ITS); Security; ITS communications security architecture and security management", Nov. 10, 2016 , p. 1-38, XP014279902.
Thomas Rosenstatter, "Modelling the Level of Trust in a CooperativeAutomated Vehicle Control System", Sep. 18, 2016, Retrieved from the Internet: URL:http://hh.diva-portal.org/smash/get/diva2:971943/FULLTEXT02.pdf, total 102 pages. XP002775986.

\* cited by examiner

| | Feature | Approx. Size (Bytes) | Observable with |
|---|---|---|---|
| Static | Vehicle Registration Number/Object ID | 10 | Camera/LiFi/mmWave |
| Static | Color | 4 | Camera/LiFi/mmWave |
| Static | Vehicle Make and Model: Complete or part of the VIN: WMI (3 bytes) + VDS (6 bytes) + VIS (8 bytes) | 17 | Camera/LiFi/mmWave |
| Dynamic | Geo-location and Heading | 14 | (Stereo) Camera, LiDAR, mmWave, D2D (802.11p, sidelink), LiFi |
| Dynamic | Current and future trajectory/Lane number | variable | D2D (802.11p, sidelink), LiFi |
| Dynamic | Unique or distinguishable feature (ex. Artwork, wireless fingerprint, etc.) | variable | Camera, D2D (802.11p, sidelink), LiFi |

Figure. 11

METHOD AND APPARATUS FOR MANAGING COMMUNICATION LINKS WITH A PLURALITY OF TRAFFIC NODES

CROSS-REFERENCE TO RELATED APPLICATIONS

This application is a continuation of International Application No. PCT/EP2017/053863, filed on Feb. 21, 2017, the disclosure of which is hereby incorporated by reference in its entirety.

FIELD OF THE INVENTION

This invention relates to devices and techniques for managing communication links, in particular between traffic-related objects.

BACKGROUND

Situations can be envisaged in which it may be desirable for traffic-related objects to be able to communicate with one another. Traffic-related objects or traffic nodes may include moving vehicles and stationary entities such as stationary vehicles, road side units, pedestrians and smart traffic lights, for example. In particular, it may be important for moving vehicles to be able to communicate with other moving vehicles and for stationary entities to be able to communicate with them as well as with each other. These types of communications have been termed Vehicle-to-everything (V2X) communications and they may encompass various sub-types such as Vehicle-to Vehicle (V2V), Vehicle-to-device (V2D) and Vehicle-to-Infrastructure (V2). With some currently-proposed systems, no infrastructure is required i.e. such communications can proceed directly between entities.

A principle consideration with the above-discussed communications is that of safety as between moving vehicles, if such vehicles are autonomous. For example, one vehicle may wish to make a maneuver, such as a lane change, and would want to establish the locations and movement trajectories of other nearby vehicles. Other considerations include a wish to warn a vehicle of a danger or an emergency situation, a desire to discover and join a vehicle platoon, law enforcement (e.g. a police car wishing to order a suspicious vehicle to pull over), inter-vehicle infotainment (e.g. virtual or augmented reality gaming or social networking) and determining one's location based on observations of other traffic-related objects.

Efforts to date have focused on designing communication capabilities between traffic-related objects to ensure that such communications are possible for the above reasons. One aspect of this is the ability of traffic-related objects to assess their context i.e. to be able to sense the presence of other objects. Another aspect is the provision of wireless communication capabilities between traffic-related objects. However, little consideration has been given to the possibility of abuse of such communications and the undesirable effect that could have. For example, a malicious node could attempt to set up communications with an unsuspecting legitimate traffic node or a malicious node could attempt an eavesdropping or man-in-the-middle (MITM) attack on a communication from one legitimate node to another. At best, such malicious communications could be a nuisance for traffic-related objects and/or the communication network in which they occur and at worst, they could endanger traffic-related objects either directly or by interfering with operations of the communication network.

SUMMARY

It is an object of the invention to provide techniques for addressing security of communications between traffic-related objects, and in particular to provide techniques for fast and secure wireless link establishment mapped to real-world observation and cognition.

The foregoing and other objects are achieved by the features of the independent claims. Further implementation forms are apparent from the dependent claims, the description and the figures.

According to a first aspect, an apparatus is provided that is arranged to manage communication links with a plurality of traffic nodes registered with a radio network. The apparatus is configured to receive a request from a first traffic node to establish a communication link with a second traffic node. At least the second traffic node is one of the plurality of traffic nodes. The apparatus is further configured to receive, from the first traffic node, object description information associated with the request, compare the object description information with stored information relating to at least some of the plurality of traffic nodes, determine, based on the comparison, a likelihood that the object description information pertains to the second traffic node and decide, in dependence on the determination, whether to grant the request. The apparatus in this context is an apparatus able to act as a traffic node manager for the radio network and could be a network node such as a Base Station (BS) or Base Transceiver Station (BTS) or a dedicated vehicle identity manager for example. Regardless of whether traffic nodes are able to communicate directly with each other in accordance within a V2X protocol scenario, an advantage of requiring context-related communications to occur via such an apparatus is that a communication request can be safely managed. Thus regardless of whether the first (requesting) traffic node is registered with the radio network, the second traffic node, which is a member of the radio network, can be protected from unsolicited communication requests, which may be malicious. Thus if the first traffic node is making a legitimate request and the object description information likely corresponds to the second traffic node, the request may be granted. On the other hand, if the first traffic node is rogue and has sent false object description information, the comparison may indicate that the object description information likely does not pertain to the second traffic node and hence may be malicious—in this case, the request can be denied. Moreover, no direct communication between the two traffic nodes is needed until the apparatus has established the legitimacy of the request from the first traffic node. At this stage, the apparatus is in a position to advise the second traffic node of the identity of the first traffic node, without the second traffic node having had to make its own enquiry directly with the first traffic node. Thus security can be safely established between the two nodes with the assistance of the apparatus, and they can then be allowed to communicate directly if desired.

In some embodiments, the apparatus may be configured to decide to grant the request if the determined likelihood is equal to or higher than a predetermined threshold. The predetermined threshold may be a number that may indicate a safe level of likelihood. The threshold could be permanently fixed or it could be changed depending on, for example, network conditions.

In some embodiments, the apparatus may be configured to receive from each of one or more further traffic nodes, a request to establish a communication link with the second traffic node and receive object description information associated with each request. For each request, the apparatus can compare the object description information with stored information relating to at least some of the plurality of traffic nodes, determine, based on each comparison, a likelihood that the object description information associated with each request pertains to the second traffic node and prioritize granting of the requests in dependence on the determined likelihoods. In this manner, the apparatus is able to manage multiple requests from multiple traffic nodes to communicate with the second traffic node. For example, if the likelihood of one request genuinely pertaining to the second traffic node is higher than the likelihood of another request genuinely pertaining to the second traffic node, the first request may be granted, whilst the second request may be denied. In other words, another way in which the apparatus can decide whether to grant a request, which may be used instead of or in addition to the threshold test discussed above, is to compare one or more requests.

In some embodiments, the apparatus may be configured to receive from each of the one or more further traffic nodes an indication of a priority of a message to be communicated to the second traffic node via the requested communication link. The apparatus can prioritize granting of the requests in dependence additionally on the indicated message priorities. Thus, as well as sending object description information, a requesting traffic node can send an indication as to the priority of a message which it wishes send to the second traffic node over the requested communication link. It could indicate that, whilst legitimate, a request such as a desire to set up social networking may have a relatively low priority. However, if it is needed to make an urgent communication with the second traffic node, for example relating to an impending danger facing the second traffic node, it could indicate that the message to be transmitted has a high priority. It is possible that another request from another node was calculated by the apparatus to have a higher likelihood of pertaining to the second traffic node, for example if the other node is able to send better object description information as a result of, say, having a better line-of-sight on the second vehicle. The feature of being able to also take account of an indicated priority of a message to be sent can be used in addition to or instead of the threshold test and the request comparison test described above. It allows the apparatus to prioritize urgent messages notwithstanding the quality of the object description information provided by simultaneous or substantially simultaneous requests to communicate with a given traffic node. Other tests may be alternatively or additionally be applied. The ability to prioritize requests by using any of the aforementioned tests may be useful in managing network resources and traffic node resources by allowing certain communications to be transmitted before others. This capability can avoid network overload. It can also result in a traffic node receiving certain messages before others and protect it from large number of simultaneous requests.

In some embodiments, the apparatus may be configured to store or access the stored information. The stored information may comprise one or more of a network identity of each of the plurality of traffic nodes, static object description information pertaining to each of the plurality of traffic nodes, and dynamically-updated object description information received from active ones of the plurality of traffic nodes. The dynamic object description information received from each active traffic node may include temporal context information obtained by the traffic node pertaining to at least some of other ones of the plurality of traffic nodes. Thus the apparatus may store information pertaining to some or all of the registered traffic nodes or it may be able to access that information in a storage facility such as a memory located separately from the apparatus. Either way, as well as having a list of registered traffic nodes based on their network identities and information such as vehicle make, model and license number, the apparatus can also refer to changing information about registered traffic nodes. Such changing information may include information about the context of a traffic node, for example its location, velocity and surrounding objects. These could be traffic nodes or other objects. If the traffic node is moving, its location and velocity can change with time. If the traffic node is moving or stationary, the layout of objects can change with time. Such temporal context information can be obtained by regularly polling some or all traffic nodes registered to the network for information pertaining to other traffic nodes that each node encounters, to thereby build up a constantly-changing picture of the context of the registered traffic nodes, including the second traffic node. Any or all of these types of information can assist the apparatus in making comparisons with received object description information.

In some embodiments, the apparatus may be configured to grant a request by sending a security key or an indicator of a security key to the requesting traffic node. Such a security key may be a shared key or a pair of security keys. This capability allows the apparatus not only to decide to grant a request to establish a communication link but to enable such a link to be set up in a secure manner such that subsequent communications between the first and second traffic nodes are secure. This can prevent future eavesdropping or MITM attacks.

In some embodiments, the apparatus may be arranged to manage communication links in a radio network that permits direct communication between registered traffic nodes. As explained previously, features described herein are useful regardless of the particular protocols being operated within a radio network. However, they may be useful in situations where direct communications between traffic-related nodes are generally allowed within the network, because they can enable intervention in establishment of new communications links which might otherwise be established as the result of a rogue request made directly to a node. Since $3^{rd}$ Generation Partnership Project (3GPP) mobile system specification Release 12, direct (D2D) communications have been allowed, so this is one example of a type of network in which examples described herein may be useful.

In some embodiments, the second traffic node may be a single one of the plurality of traffic nodes having a unique security key. Alternatively, the second traffic node may be a subset of the plurality of traffic nodes, each of which holds a group security key, and wherein the apparatus is configured to determine a likelihood that the object description information pertains to at least some of the subset. Thus aspects described herein can protect requests for establishment of unicast or multicast communications.

According to a second aspect, a method of managing communication links with a plurality of traffic nodes registered with a radio network is provided. The method comprises receiving a request from a first traffic node to establish a communication link with a second traffic node. At least the second traffic node is one of the plurality of traffic nodes. The method further comprises receiving, from the first traffic node, object information associated with the request, comparing the object information with stored information relating to at least some of the plurality of traffic nodes, determining, based on the comparison, a likelihood that the object information pertains to the second traffic node, and deciding, in dependence on the determination, whether to grant the request. This aspect can be implemented by an apparatus able to act as a traffic node manager for the radio network and could be a network node such as a Base Station (BS) or Base Transceiver Station (BTS) or a dedicated vehicle identity manager coupled with a dedicated vehicle security manager, for example. It provides similar advantages to the first aspect.

According to a third aspect, a computer program product comprising a computer-readable medium storing instructions is provided. When the instructions are executed by at least one programmable processor, they cause the at least one programmable processor to perform operations to implement a method. The method comprises receiving a request from a first traffic node to establish a communication link with a second traffic node. At least the second traffic node is one of the plurality of traffic nodes. The method further comprises receiving, from the first traffic node, object information associated with the request, comparing the object information with stored information relating to at least some of the plurality of traffic nodes, determining, based on the comparison, a likelihood that the object information pertains to the second traffic node, and deciding, in dependence on the determination, whether to grant the request. This aspect can be implemented by software, which may be transitory or non-transitory, operating in or in connection with an apparatus able to act as a traffic node manager. It provides similar advantages to the first and second aspects.

According to a fourth aspect, an apparatus associated with a first traffic node is provided. The apparatus is configured to send to a traffic node manager of a radio network, a request to establish a communication link with a second traffic node registered with the radio network, obtain object description information associated with the second traffic node, send the object description information to the traffic node manager, await receipt of a grant or denial of the request from the traffic node manager, and upon receipt of a grant of the request, communicate with the second traffic node. Such an apparatus may be either on board the first traffic node or controlling its communications from an off-board location. In this scenario, the first traffic node may be registered with the network or unregistered. It may be pre-set up to make requests to establish communications with other traffic nodes via the traffic node manager. Alternatively, it could be registered or unregistered and may not be so pre-set up but could have already attempted to establish communications with the second traffic node directly and been informed that it has to send its request to the traffic node manager. Either way, having a requesting node configured in this way promotes secure communications within the network and thus carries similar advantages to those of the first through third aspects. The traffic node manager could be practically implemented by similar apparatus as described above in respect of the first through third aspects.

According to a fifth aspect, an apparatus associated with a second traffic node registered with a radio network is provided. The apparatus is configured to refuse establishment of a direct request to communicate received from a first traffic node if no communication link exists between the first and second traffic nodes. The apparatus is also configured to await establishment of a secure communication link from a traffic node manager of the radio network which has received a request from the first traffic node to establish a communication link with the second traffic node, and, upon receipt of notification of establishment of the secure communication link, communicate with the first traffic node. Thus a node which is a target of a request to establish a communication link is set up to protect itself by following a protocol for handling such requests that is compatible with the mechanisms of the first through fourth aspects described above. Thus this aspect has similar advantages to those of the first through fourth aspects and brings improved security for a user of a traffic node that may receive communication requests.

According a sixth aspect, a traffic node is provided. The traffic node comprises one or both of the above-described apparatus associated with a first traffic node or associated with a second traffic node registered with a radio network. Such a traffic node may be a vehicle, roadside unit, pedestrian with a smart phone or smart traffic lights etc. Such a traffic node may incorporate an apparatus that can implement either of the fourth or fifth aspects or alternatively, a single apparatus that can implement both. It may be advantageous for such apparatus to be carried on-board the traffic node. For example, in the case of a moving vehicle, that would avoid a risk of a connection between the apparatus and the vehicle being lost and it might facilitate more reliable control of the vehicle in response to messages sent across communication links established by examples described above.

Such a traffic node may comprise one or more sensors arranged to obtain object description information pertaining to other traffic nodes. The object description information may include one or more of: radio network identity; registration number; color; make; model; all or part of a vehicle identity number (VIN); geolocation; current trajectory; future trajectory; road lane; visual features; velocity; distance from traffic node; and relative position to traffic node. Armed with such information, the traffic node can determine if it needs to communicate with any other traffic nodes. If it decides it does, it can use the information to compile an object description information of a traffic node with which it wishes to establish a communication link, which can be sent to an apparatus such as a traffic node manager in accordance with any of the first through fourth aspects and related examples described above.

In such a traffic node, the sensors may include one or more of: one or more cameras providing one or more of front, rear and side views; a laser scanner such as a LIDAR sensor; a Wi-Fi receiver; a Li-Fi receiver; a mmWave receiver; a receiver for inter-traffic-node dedicated short-range communications (DSRC); a GPS detector; and a receiver configured to operate according to a protocol of the radio network. Such sensors allow a variety of information about one or more other traffic nodes to be obtained, including those listed above. Any receivers mentioned may be provided within a transceiver.

All the above-described aspects and examples may be implemented together in any feasible combination in a system such as a radio network within which multiple traffic nodes can communicate.

BRIEF DESCRIPTION OF THE DRAWINGS

The present invention will now be described by way of example with reference to the accompanying drawings. In the drawings:

FIG. 11 shows a non-exhaustive list of examples of static and dynamic features of an ODI and exemplary sensors according to an embodiment. In the figures, like reference numerals indicate like parts.

DETAILED DESCRIPTION

Figure 1A:
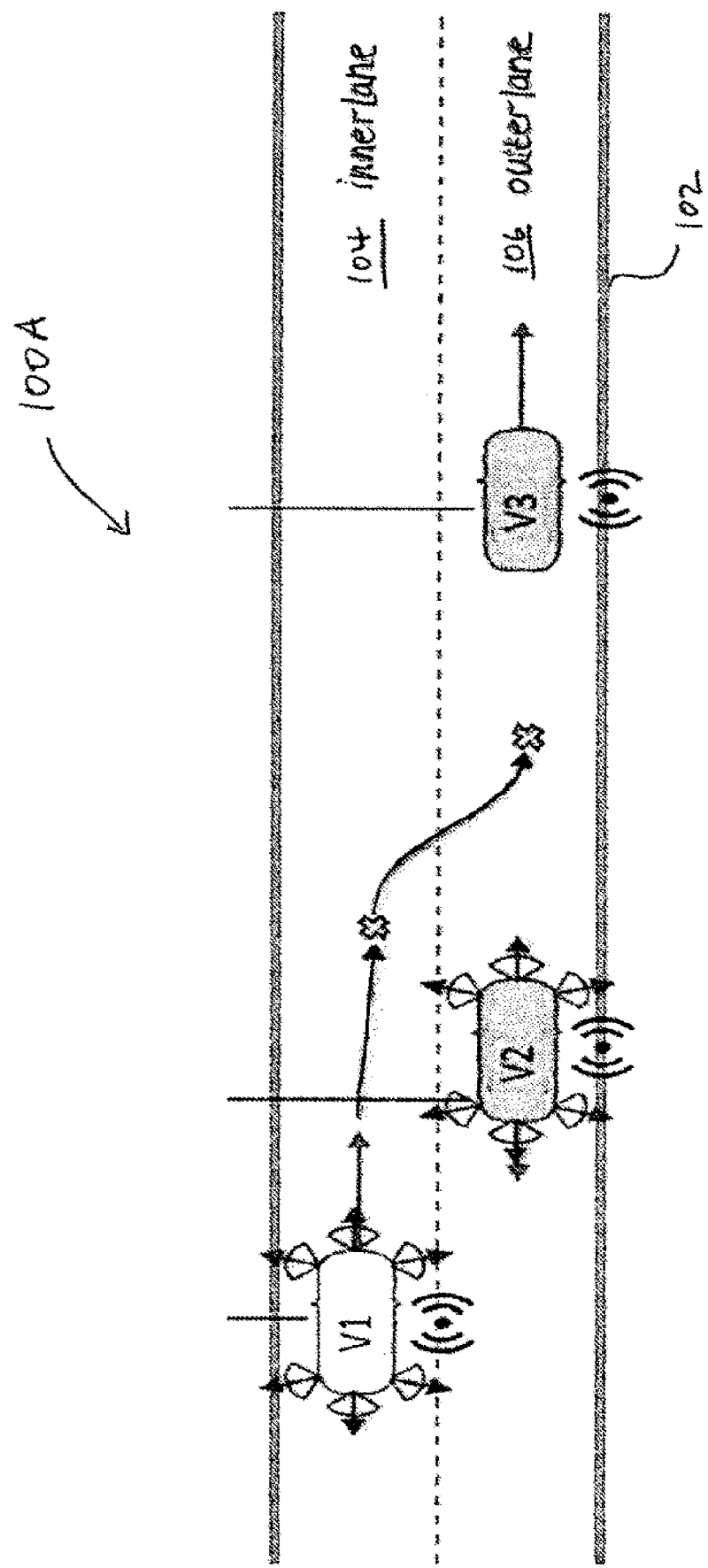
FIGS. 1A and 1B show exemplary scenarios involving traffic-related objects according to one embodiment.

There are a number of reasons why traffic-related objects may wish to communicate with one another. FIG. 1A shows in schematic plan view such a situation 100A according to one embodiment, in which the road layout and number of vehicles are purely exemplary and could be different in other examples. There are shown three traffic-related objects, a first vehicle V1, a second vehicle V2 and a third vehicle V3, moving along a straight section of a road 102. In some examples one or more of them may be an autonomous vehicle responsible for its own positioning. In some examples, one of more of them may be able to act on commands from a user such as "go faster" or "switch lane". In some examples, the vehicles may be manually-driven and the following can apply to actions taken by a driver or information given to the driver.

All three vehicles are travelling along the road 102 in the same direction, shown as rightwards in the figure. At the instant shown, V1 is in the inner lane 104, whilst V2 and V3 are in the outer lane 106, V3 being a distance in front of V2. V1 is further back along the road 102 than both V2 and V3, but it wants to maneuver into the outer lane 106 in between V2 and V3.

Whilst at the instant shown in FIG. 1A, there appears to be room for V1 to move into the gap between V2 and V3, doing so could present a hazard. For example, V1 could start its move, whereupon V2 could speed up or V3 could slow down, thus narrowing the gap. Alternatively, either one of V2 and V3 could decide to move into the inner lane, right into a location in the inner lane 104 towards which V1 may be speeding just prior to switching to the outer lane 106. These and other dangerous possibilities could occur. In order to avoid such hazards caused by relative movements of the vehicles, before making a maneuver as described above, V1 could set up communications with V2 and V3 to inform them of its intention, such that they can maintain the distance between them whilst V1 makes its maneuver. Alternatively, one or both of V2 and V3 could instruct V1 that it is not safe to make the maneuver, for example if V3 knows that it needs to brake suddenly.

Figure 1B:
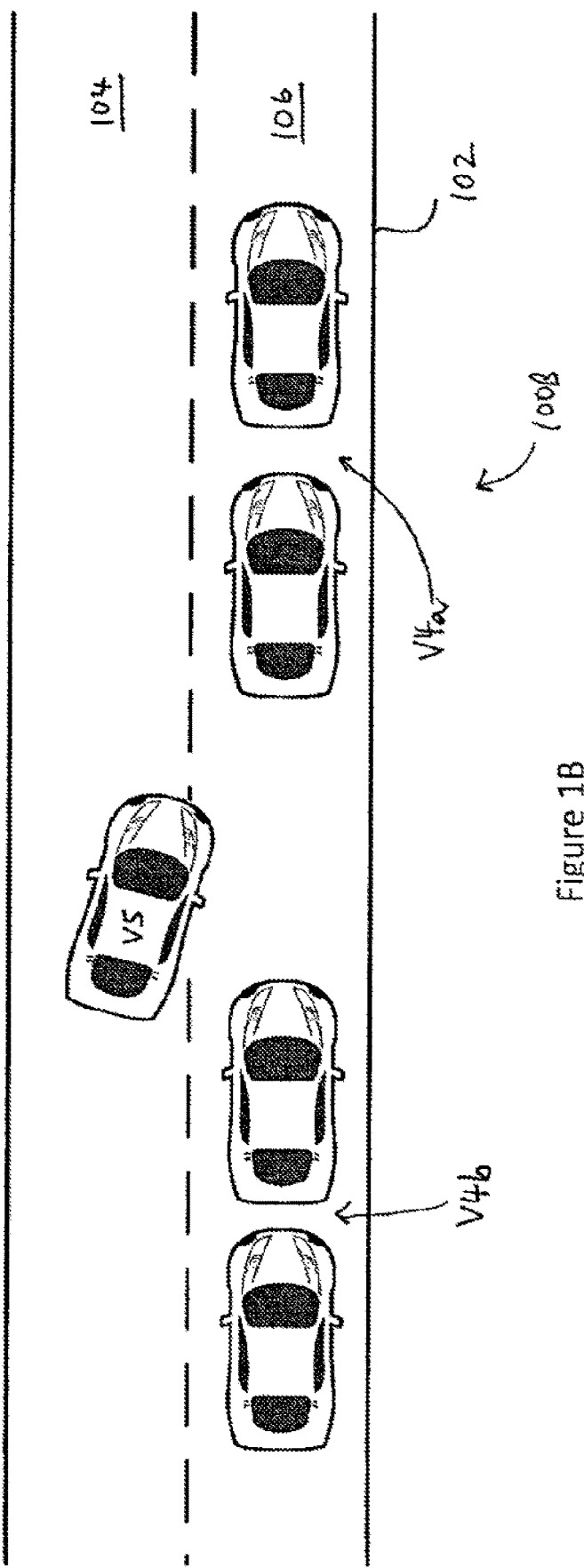

Another example in which traffic-related objects may wish to communicate with one another is a situation 100B shown in FIG. 1B according to one embodiment. A similar straight stretch of a road 102 having an outer lane 106 and an inner lane 104 is shown. Travelling in the outer lane 106 is a fleet of vehicles V4 arranged in a line. A fleet of vehicles may be a group of vehicles having a common owner or it may be a group of vehicles that are travelling in convoy. All the vehicles in the fleet may interact in the same manner with non-fleet traffic-related objects. For example, they may all be following the same route. In particular, they may be managed to communicate over a common communication link such that they can all receive a same communication from non-fleet vehicles and can send out a single communication from the fleet. In some scenarios, though, any given vehicle of the fleet may nonetheless be able to move in a different manner from other vehicles of the fleet at least to some degree.

A specific fleet situation is shown in FIG. 1B, namely that the fleet V4 is in fact a platoon of vehicles. A platoon is a group of vehicles that are all travelling together, for example because they are all headed for a same destination, be that an intermediate or final destination of each of their journeys. Having vehicles grouped into a platoon can save road space, because they can travel a much shorter distance apart than vehicles travelling singularly, which must leave a safe braking distance between each other. If less road space is occupied by vehicles, congestion should be eased and thus it should be possible for all vehicles to travel more quickly and thereby arrive at their destinations more quickly. A non-platoon vehicle V5 travelling in the inner lane 104 wishes to join the platoon V4. In order to do so, V5 needs to communicate with the platoon V4 so that it can be accepted into its common communication link. The platoon V4 can then determine, based on road conditions, how best V5 should physically maneuver itself into the platoon V4. It may be easiest for V5 to tag onto the end of the line in some examples. In the example of FIG. 1B, the platoon V4 has decided that road conditions are such that V5 should join the platoon between two existing platoon vehicles and thus a first, front group V4a and a second, rear group V4b have adjusted their relative speeds so as to open up a gap between them. Thus V5 can move into the gap. Any remaining gaps between V4a and V5 and/or V5 and V4b can then be closed up by altering relative speeds, such that the platoon V4, including newly-absorbed V5, can continue its journey with minimum distance between all the vehicles.

It will be appreciated that prior to the joining maneuver in FIG. 1B, V5 may not have known about the existence of the platoon V4. Thus another reason that V5 may wish to communicate with other traffic-related objects is to locate a platoon travelling to a same destination as itself. Alternatively, V5 may simply have wished to change lane, attempted to communicate with one of the platoon vehicles and then been informed that the vehicle belonged to the platoon V4. As previously mentioned, there are many and varied situations in which communications between traffic-related objects may be desirable.

The above-described communication-desirable scenarios call for an interaction between a communication means and a real-world scenario of one or more traffic-related objects. In many cases, this means bridging a gap that exists in many V2X concepts between, for example, a radio network and a vehicle's context. In many V2X concepts, there exists no mechanism for mapping the communication and context such that the communication can be validated. One way to validate a communication is to exchange security keys, but in many V2X concepts, there exists no mechanism for safe exchange of such keys.

Figure 2:
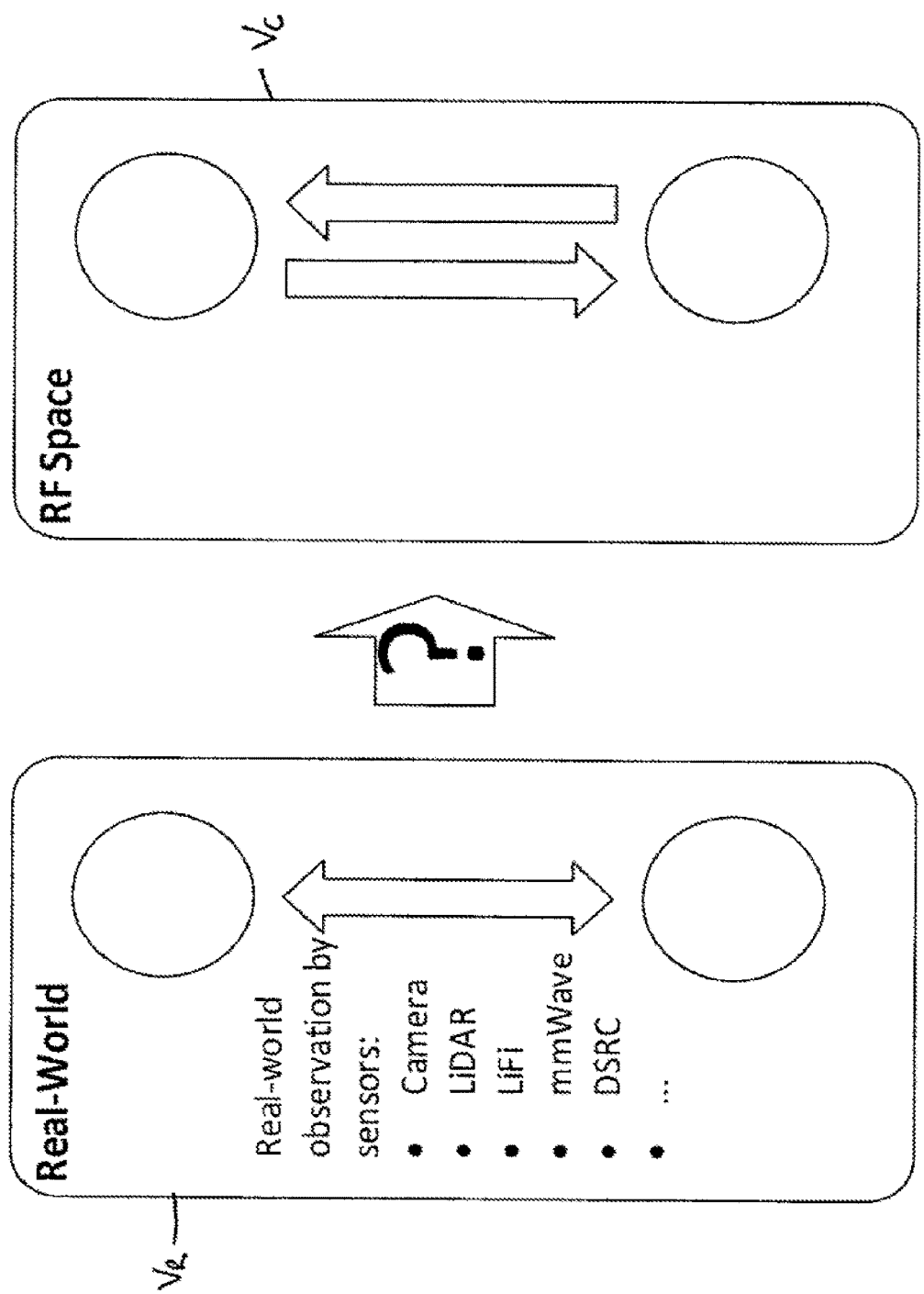
FIG. 2 shows an example of a traffic-related object according to one embodiment.

Some factors that may be relevant to bridging the gap will now be discussed with reference to the schematic illustration of FIG. 2 according to one embodiment. A vehicle V is represented as a real-world portion $V_R$ and a communications portion $V_C$, in this example indicated as being within radio frequency (RF) space of a network. The real-world portion $V_R$ can make observations of its surroundings by means of sensors such as one or more cameras, a laser scanner such as a LIDAR sensor, a Li-Fi receiver, a mmWave receiver or a short-range receiver dedicated for inter-traffic-node communications (e.g., dedicated short-range communication, DSRC). The communications portion $V_C$ can send and receive communications within the RF space. However, even though the real-world portion $V_R$ can observe other traffic-related objects, for safe communications with them, the communications portion $V_C$ needs to know their network ID and safely establish a secure link. Whilst in many existing systems it can broadcast a request to communicate with a traffic-related object, this entails direct communications between the two, which cannot be secure at the outset. Equally, a traffic-related object receiving such a request is also posed with a security risk. For example, in Device-to-Device (D2D) communications in 3GPP LTE, unicast communication is triggered by resource grants which can be assigned by the transmitting device itself choosing from a set of configured Resource Pools. Whilst there may exist general security procedures for accepting devices into a network, there is no mechanism for validating a link establishment request in relation to a real-world context, which may involve information obtained from outside the realm of the radio network (e.g.: observed data from a vehicle's various sensors).

Another factor for critical communication between devices, is the ability to support unicast and multi-cast communication within groups of devices with low setup delay. This can only be achieved if a transmitting device is aware of the network identity of a receiving device(s). This is different from typical V2X broadcast communication defined in some existing protocols such as the ITS-G5 protocols. In such protocols, the network identity for the receiving device is usually obtained via the device discovery process, which is slow and not designed for time-critical communication.

Yet another factor is relating a network identity to a real identity of a traffic-related object, so as to avoid a scenario where a rogue traffic-related object uses a false network ID. For example, a real identity may be determined by means of a license plate or VIN. These two identities are not coupled in some protocols, hence the transmitting device needs to internally map the real identity to the network identity before initiating communication.

For at least the above-discussed reasons, the overall process for unicast/multicast link establishment in many existing protocols lacks security and is slow and inefficient and unsuitable for critical communications.

Figure 3A:
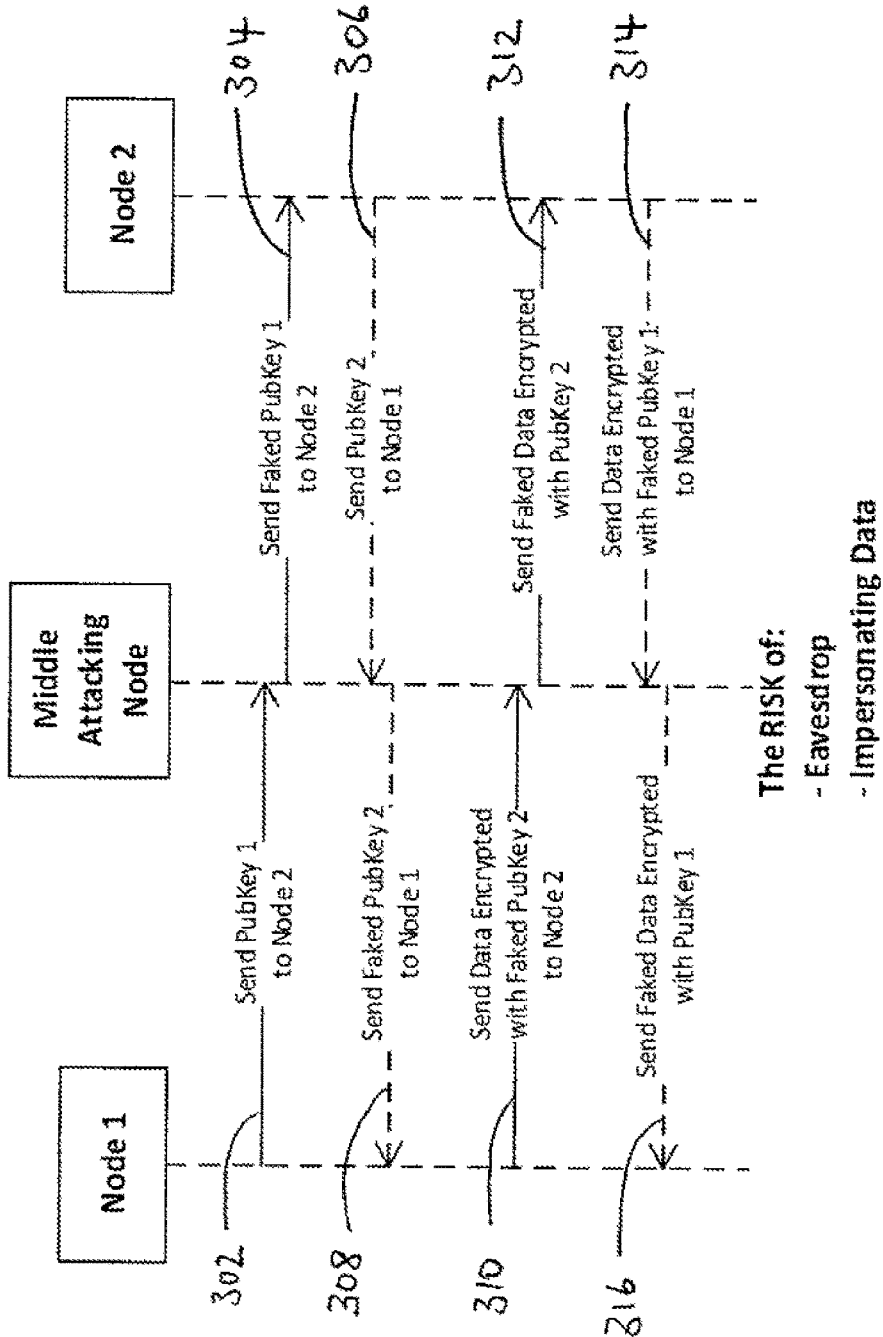
FIG. 3A shows an attack on a communication and FIG. 3B according to one embodiment shows an implementation suitable for avoiding the attack of FIG. 3A.

FIG. 3A illustrates an exemplary communication attack that may result from lack of security between traffic nodes. In this example, Node 1 (N1) and Node 2 (N2), which may be traffic-related objects, can set up a communication link directly with each other i.e. in an AdHoc manner. At 302, N1 attempts to send its public security key 1 to N2, but this communication is intercepted by a MITM attacking node (MAN), which, at 304, sends a fake public key 1 to N2. N2 is not aware that the key is fake, so in response, attempts to send a public key 2 to N1. This communication is also intercepted by MAN, which, at 308, sends a fake public key 2 to N1. N1 is not aware that the key is fake, so it then attempts to send a message, encrypted with fake public key 2, to N2 (310), which is also intercepted by MAN. At 312, MAN sends a fake message to N2, encrypted with the fake public key 2. N2 does not know the message is fake, so at 314 attempts to send a message, encrypted with the fake public key 1, to N1. MAN also intercepts this communication and at 316, sends a fake message to N1, also encrypted with the fake public key 1. N1 does not know this message is fake. The faked messages could be pernicious. In other examples, instead of interfering with the messages, MAN could simply eavesdrop on them and then forward them on.

Figure 3B:
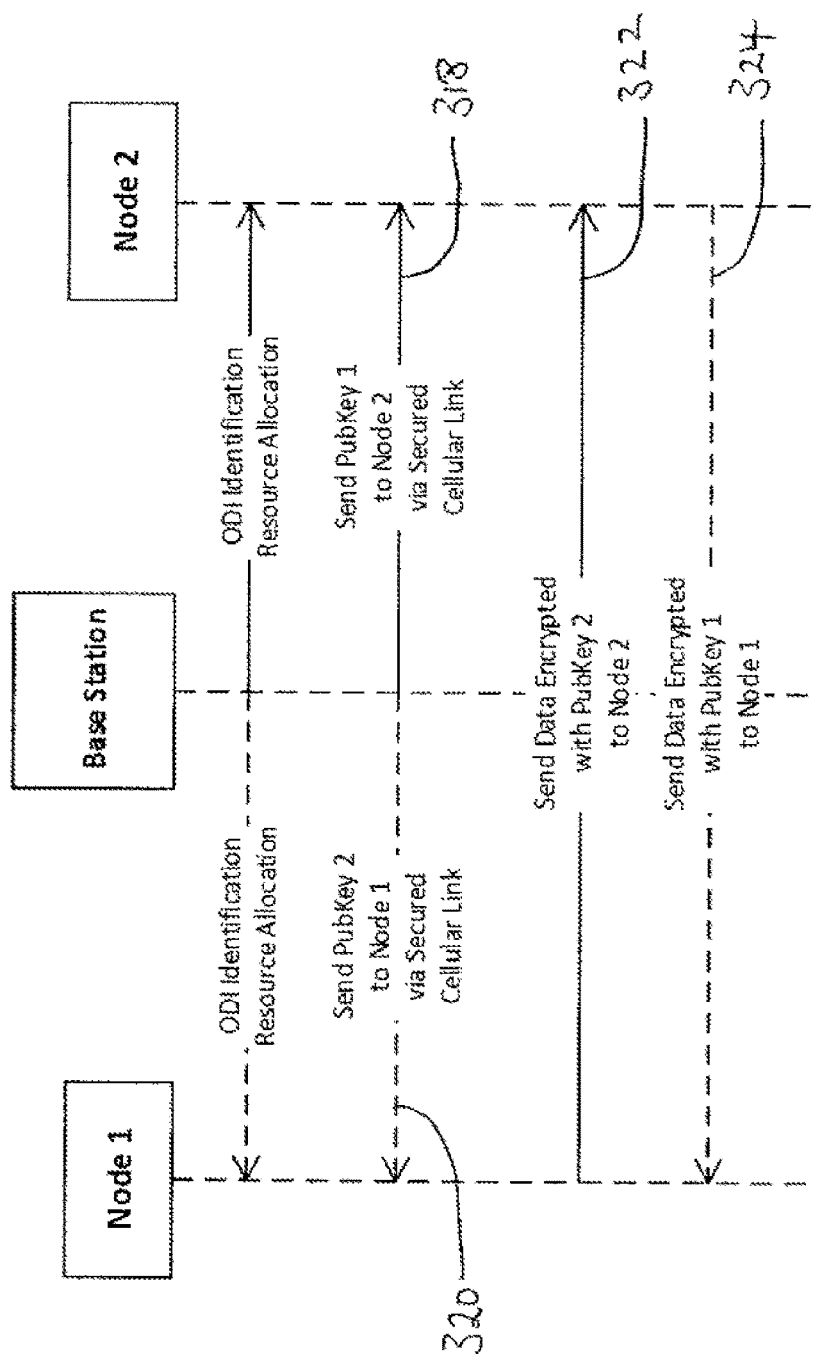

FIG. 3B illustrates in general terms how examples presented herein can address the problematic scenarios discussed above according to one embodiment. In such examples, the cellular network across which the nodes can communicate assists communications between the nodes by reliably establishing a link between them. A network node, in this example a base station (BS), acts as an intermediary for establishing a secure communication link between N1 and N2. The BS may address the issues of identifying N1 and N2 and resource allocation, as will be described in more detail below. At 318, rather than N1 sending public key 1 directly to N2, BS sends it to N2 and at 320 BS sends public key 2 to N1. These two communications may happen simultaneously or sequentially. Either way, N1 and N2 both receive a valid security key, which they can use subsequently to encrypt communications between them, thereby ensuring that each receives messages intended by the other, as opposed to fake messages as in FIG. 3A. Thus at 322 N1 can send a message encrypted with public key 2 to N2 and at 324, N2 can send a message encrypted with public key 1 to N1. Subsequent messages can be sent in a similar manner.

Another benefit of the above-discussed protocol which is not found in many prior art protocols, relates to radio resources. In many existing protocols, there is no radio resource mechanism to grant or prioritize a link establishment request. This can be important as radio resources may be scarce and signaling procedures for link establishment may be expensive, for example if a Certificate Authority signature is required. Hence, it is important to ensure that V2X resource grants are provided only to validated devices and communication links or at least provided on a priority basis. In other words, prioritization of multiple requests to establish links may be based on the real-world validity of the intended communication link. Alternatively or additionally, link set-up may be prioritized based on urgency of a message to be transmitted or other considerations. These considerations will be discussed in more detail below.

Figure 4:
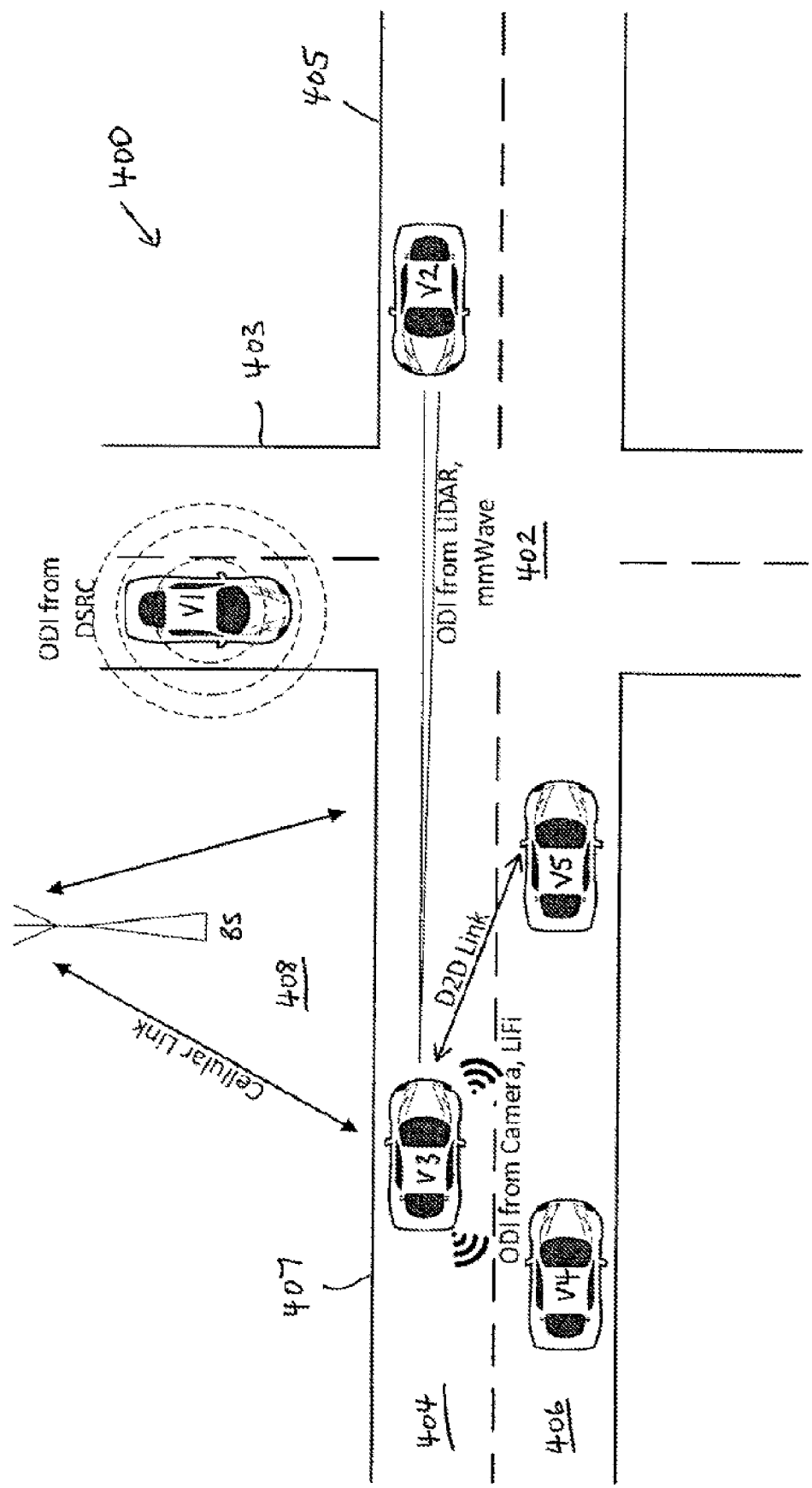
FIG. 4 shows another exemplary scenario involving traffic-related objects according to one embodiment.

FIG. 4 shows schematically an exemplary scenario 400 according to one embodiment in which a secure link establishment as described above with respect to FIG. 3B might be useful. The figure also indicates some technology which may be provided to facilitate secure link establishment. A road intersection in the form of a crossroads 402 is depicted in plan view. One vehicle V1 is shown approaching the cross-roads from a first section of road 403 which runs vertically in the figure. Another vehicle V2 is situated on a right-hand side of the cross-roads, on a second section of road 405 which runs left-right in the figure, and is travelling from right to left, approaching the junction. Three other vehicles V3, V4 & V5 are shown travelling rightwards on a third branch 407 which also runs left-right in the figure, and are also approaching the cross-roads. V3 is situated in an inner lane 404 of the third branch 407. V4 and V5 are in an outer lane 406 of the third branch 407. In the direction of travel, V4 is less than a vehicle length ahead of V3 and V5 is a distance behind V3.

FIG. 4 depicts some examples of possible observations that vehicles V1 through V5 can make so as to observe and assess their real-world physical context. V3 has a camera and a LiFi sensor with which it can observe V4 and V5. Thus it can be aware of their nearby presence, which may be useful to keep a check on safety of its trajectory or should it wish to make a maneuver for example. V2 is also able to observe V3 by means of one or more of a camera, a LIDAR sensor and a mmWave sensor and can thus assess the situation at the cross-roads 402. V1 is equipped with a Description Information (ODI) pertaining to the other node to the BS. This may be sent with or separately from a request to establish a communication link. The ODI can be generated from data obtained using sensors on the traffic-related node, which sensors can be used to observe surrounding nodes, as just described with respect to FIG. 4. The following table shows a non-exhaustive list of possible sensor technologies and the information that may be derived from them:

TABLE 1

Various Sensors and ODI Observations

| Sensors | Techniques | Observable Information |
|---|---|---|
| Camera | Vehicle Make and Model Recognition | Vehicle's Registration Number |
| | Automatic Number Plate Recognition | Vehicle's Make and Model |
| | Range Imaging | Vehicle's Color |
| | | Object's distance |
| LiDAR | 3D Laser Scanning | Object's external form |
| | | Object's relative distance and position |
| LiFi | Visible Light Communication | Vehicle's identity sent by the vehicle's Automotive Lighting System |
| mmWave Device | mmWave Radar | Vehicle's distance and speed |
| | mmWave Radio | Vehicle's identity sent by the mmWave radio |
| DSRC Radio (e.g. 802.11p) | Cooperative Awareness Message (CAM) | CAM: vehicle's reference location, station ID |
| | Decentralized Environmental Notification Message (DENM) | DENIM: situation, severity, event postion, trace location with waypoints (good for NLOS sensing) |

DSRC sensor, which may be useful for a number of reasons. Given its relative position to the other vehicles in this example, avoiding a collision by communicating with one or more of vehicles V2 through V5 as it approaches the crossroads is one possible use. For example, vehicles V2 through V5 may be required to give way to vehicle V1 and therefore V1 may wish to communicate its presence to them.

As well as the above-discussed sensing capabilities, FIG. 4 also depicts some communication possibilities between the vehicles. V3 and V5 are shown as being connected to a BS of a cellular network 408. V3 and V5 are also connected to each other over a D2D link. This D2D link could have been established via the BS as described with respect to FIG. 3B. This link could be useful if, for example, V3 wishes to move into the outer lane 406 in between V4 and V5. A similar communication link could be set up between V3 and V4 for this purpose. V4 and V5 could also usefully communicate for the same purpose and for other reasons such as to manage their relative distance apart.

It will be appreciated that other road intersections and layouts are applicable to examples discussed herein. It will also be appreciated that any vehicles can be provided with any number of the same or different sensors and can interact in one or more ways. Such sensors allow the vehicles to observe and understand their real-world physical context, whilst the radio network connections allow them to set up communication links with other vehicles to enable them to send and receive communications that are relevant to their real-world physical contexts. Thus a mechanism for relating physical context to communications can be provided. Examples of such a mechanism will be discussed in the following.

In examples described herein, a traffic-related node wishing to establish a communication link with another node in accordance with the general principles discussed above with respect to FIG. 3B, is required to send an associated Object The ODI can be summarized as follows:

It is a representation of a set of features that describe and/or identify an object with a certain confidence level.

It is generated by or on behalf of a node wishing to set-up a communication link, either by observing the target object (i.e. the intended recipient of the requesting node) or by acquiring it directly from the target object (e.g. via a broadcast radio communication). It may be generated in accordance with a pre-defined format.

It can be included in the radio signal transmitted by the requesting node, or transmitted separately therefrom, to the network. The "network" in this context may mean a BS as in FIG. 3B or another network node such as a BTS or a dedicated traffic node manager. If a feasible ODI is received by the network, this can enable the requesting node to obtain the network identity of the target node from the network. It can also enable the requesting node to obtain radio resources for communication with the target node (over D2D or cellular link) and the private/public keys for both the requesting and target nodes. These provisions will be explained in more detail with respect to FIGS. 5 & 6 below.

The ODI includes static and dynamic features. Static features do not change or change very rarely (and such changes can be informed to the network in advance). Dynamic features are time-dependent and context-based and are updated much more often, the exact period depending on the feature. For example, vehicle positions change on a much smaller timescale than the current lane in which the vehicle is moving.

FIG. 11 shows a table that indicates a non-exhaustive list of examples of static and dynamic features of an ODI and exemplary sensors with which they may be obtained.

Static features can be provided when a traffic-related node registers with the cellular network or becomes active in it. Dynamic features can be updated for an active node, by various means as will be described with respect to FIG. 7 below.

Figure 5:
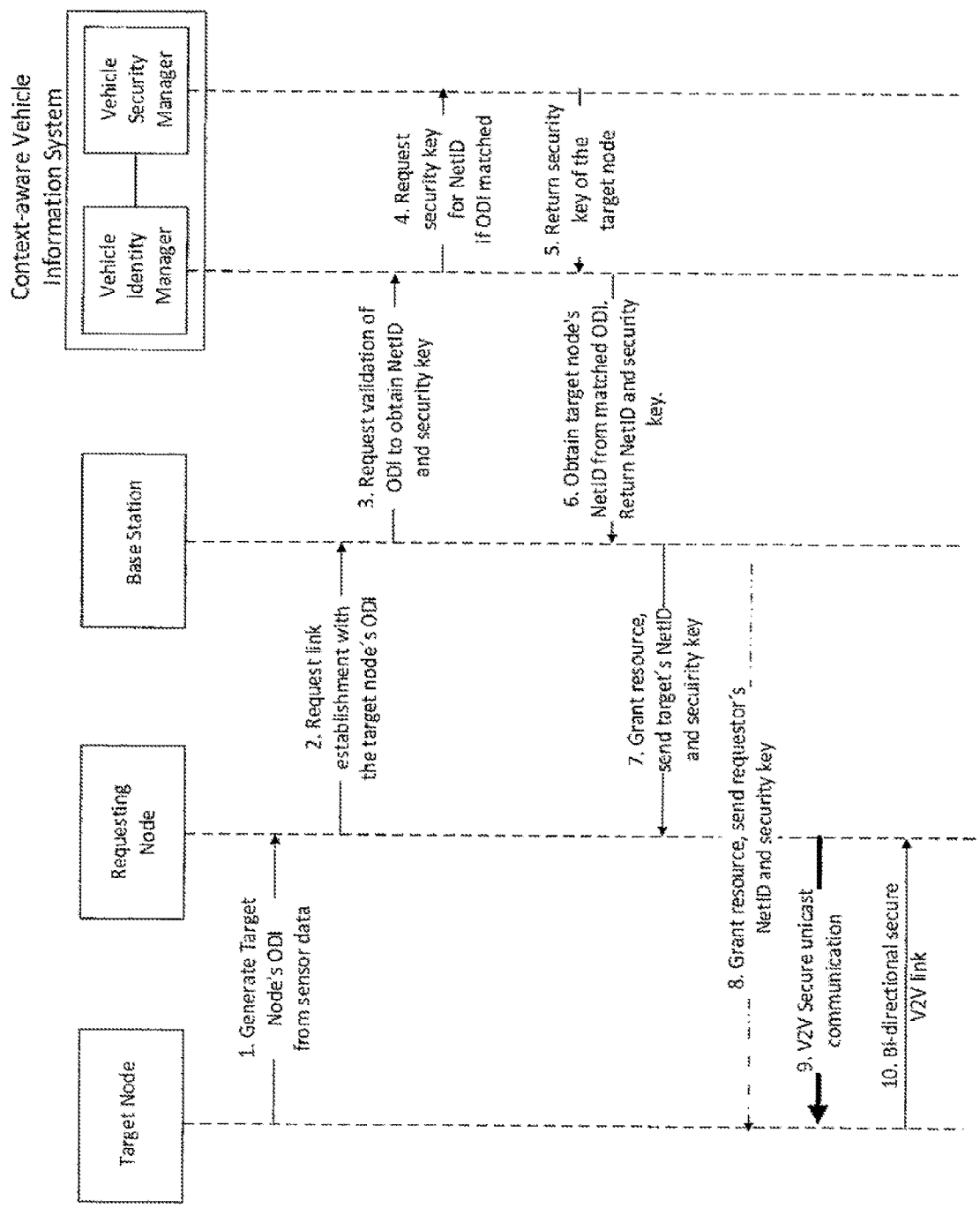
FIG. 5 shows an example of unicast communication according to one embodiment.

FIG. 5 shows a signaling protocol for setting up a unicast communication link between a requesting and target node according to one embodiment. In such implementations, the target node is a single one of a plurality of traffic-related nodes that are within range of a radio network and likely within the physical vicinity of the requesting node, such that communication between the two might be desirable. The protocol can be used to decide whether to establish the link and if so, to establish it in a secure manner. The entities shown in FIG. 5 are:

- A requesting node that wishes to set up a communication link with a target node
- A BS
- A data storage means, which in this example is termed a Context-Aware Vehicle Information System (CVIS). The CVIS includes a Vehicle Identity Manager (VIM) and a Vehicle Security Manager (VSM). The VIM stores information pertaining to traffic-related nodes that are registered with the network. This can be achieved by maintaining a database of tuple (ODI and network ID) of active nodes in the network. This can include static and/or dynamic information, such as the types of data shown in Table 2 above. The VSM is responsible for managing security keys or other security protocols for use in network communications among traffic nodes. The CVIS may be provided at the BS or situated separately but accessible by it and the two together can be considered to be a traffic node manager.

The signals are as follows:
1. An ODI for the target node is generated by the receiving node observing the target node using sensors.
2. The requesting node sends a request for establishment of a unicast link and the ODI to the BS.
3. The BS requests validation of the request to the VIM.
4. The VIM determines whether the ODI matches stored information pertaining to a registered node by comparing the ODI with stored information about at least some registered nodes. If a match is found, the VIM requests a security key for the target node from the VSM.
5. The VSM returns the requested security key to the VIM.
6. The VIM obtains the target node's network ID by reference to the stored information relating to the matching registered node and sends the network ID and security key to the BS. The security key may be a public key, a secret session key, a temporary (time-bound) secret key or a key generated on the fly.
7. The BS decides to grant resources for the requested communication link and sends the network ID and security key to the requesting node. In an alternate implementation, the BS can send an indicator to the requesting node, which enables the requesting node to generate a key itself. It may optionally also send a public encryption key.
8. The BS also sends the requesting node's network ID and public key to the target node. An alternative to sending a security key or indicator to each of the requesting and target nodes is to send a shared session key to both nodes. Optionally the BS may also grant the target node network resources to communicate with the requesting node.
9. Once in receipt of a security or session key, the requesting node can send a secure unicast message to the target node having encrypted it with the key.
10. If the optional actions of steps 7 and 8 were taken, a bi-directional, secure V2V link can be made between the requesting and target nodes.

Figure 6:
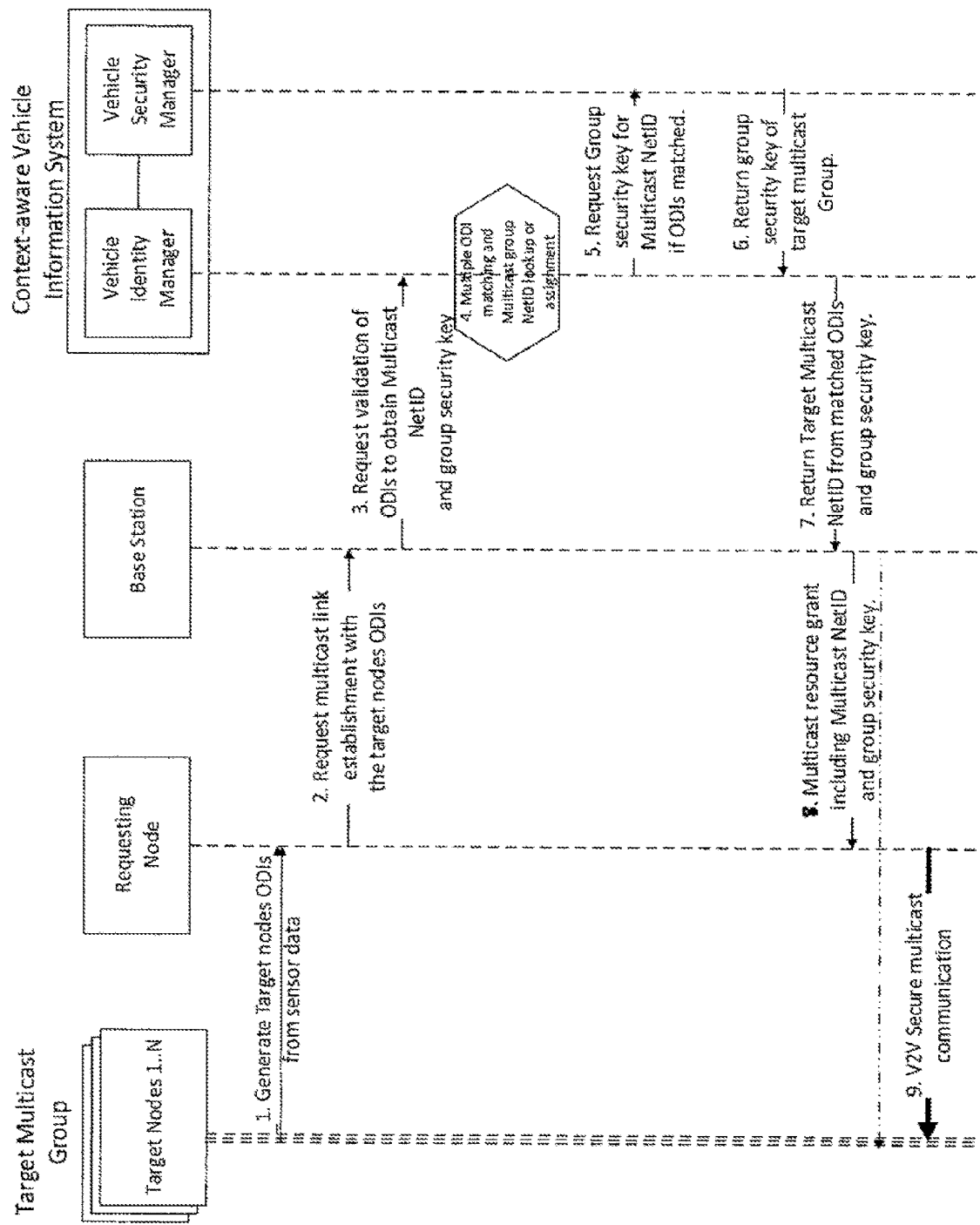
FIG. 6 shows an example of multicast communication according to one embodiment.

FIG. 6 shows a signaling protocol for setting up a multicast communication between a requesting and target node according to one embodiment. In such implementations, the target node is multiple ones of a plurality of traffic-related nodes that are operating as a group or fleet, for example such as a convoy or platoon. The fleet is within range of a radio network and likely within the physical vicinity of the requesting node, such that communication between the two might be desirable. The entities shown in FIG. 6 are otherwise similar to those shown in FIG. 5. As with the protocol of FIG. 5, the protocol can be used to decide whether to establish the link and if so, to establish it in a secure manner.

The signals are as follows:
1. At least one ODI for the target node is generated by the receiving node observing the target node using sensors. The observations may entail observing only one or some of the nodes forming the group and hence multiple ODIs may be sent.
2. The requesting node sends a request for establishment of a multicast link and the ODI/ODIs to the BS.
3. The BS requests validation of the request to the VIM.
4. The VIM determines whether at least one of the ODI/ODIs match stored information pertaining to a registered group node by comparing the ODI with stored information.
5. If a match is found, the VIM obtains a group security key based on the stored data found to match. If multiple ODIs were received and they all relate to a single, known group, this may be an existing group NetID (GNetID). If, on the other hand, some of the vehicles that are found to match are not part of a group or an existing group, it may be a new GNetID generated for the entirety of the vehicles found to match. The VIM requests, from the VSM, a group security key for the target node to match the GNetID.
6. The VSM returns the requested group security key to the VIM.
7. The VIM sends the GNetID and group security key to the BS. As with the scenario of FIG. 5, the security key may be a public key, a secret session key, a temporary (time-bound) secret key or a key generated on the fly.
8. The BS decides to grant a multicast network resource for the requested multicast communication link and sends the GNetID and group security key to the requesting node. In an alternate implementation indicated by a chained arrow, the BS can send an indicator to the multicast group which enables every group member in the target node to independently generate the shared key.
9. Once in receipt of the group security or session key (or once the group has generated a shared key per the alternate implementation mentioned in signal 8 above), the requesting node can send a secure multicast message to the target node group having encrypted it with the key. In this instance, the "target node" means all identified and matched vehicles in the group. Sending of the message could be achieved by a single communication sent to the group which is then distributed among the group, or a communication sent from the BS to each member of the group.

Operations of a BS and CVIS that may participate in scenarios as described above will now be discussed in more detail. As previously mentioned, the BS and CVIS may be physically implemented together or separately and may be an adapted regular network entity or may be a dedicated machine.

As can be understood with reference to FIGS. 5 & 6 as described above, two functions of the CVIS/BS are to compare a received ODI with stored data and to use the result of that comparison to decide whether to grant a request for establishment of a communication. A priority of such requests with respect to other requests and other network resources can also be determined. In the following, tasks undertaken by the CVIS/BS are described in general terms, in which node K is the requesting node and node P is the target node. Tasks specific to an exemplary scenario are then shown:

General description of Tasks and Terminology:

$f^k_i$: Observed feature i by node k.

$ODI^K(P)$: ODI of Node P as observed/received by Node K.

ODI is a collection of features of the target node B as observed/received by a requesting node K:$ODI^K(P)$: $\{f^K_1, f^K_2, f^K_3 \ldots f^K_n\}$ Define a matching function $g_f(f1, f2)$ that describes how likely two measurements f1 and f2 of the same feature f are two measurements of the same vehicle or belong to the same vehicle.

Define a global matching function $G(ODI_a, ODI_b) = \gamma(g_f \forall (f))$, where $\gamma$ is some function of the component matching functions for individual features. G describes how likely two ODIs $ODI_a$ and $ODI_b$ are belonging to the same vehicle.

Example Scenario:

Vehicle A and Vehicle C wish to communicate with Vehicle B at the same time or substantially the same time:

Vehicle A sends link establishment request to BS with $ODI^A(B) = \{f^A_1, f^A_2, f^A_3 \ldots f^A_n\}$ Vehicle C sends link establishment request to BS with $ODI^C(B) = \{f^C_1, f^C_2, f^C_3 \ldots f^C_m\}$ BS or CVIS contains a stored $ODI^{BS}(B)$, obtained during registration into the network (e.g. by a Network-Attached Storage (NAS) Security Mode Procedure)

ODI matching criterion: If $G(ODI^A(B), ODI^{BS}(B)) < \varepsilon \rightarrow$ do not establish link.

Link Establishment Prioritization: If $G(ODI^A(B), ODI^{BS}(B)) > G(ODI^C(B), ODI^{BS}(B))$, Prioritize link A→B over C→B.

In the above, the global matching function G provides an exemplary means of determining a likelihood that an ODI, and hence a request to establish communication, does in fact pertain to a real traffic-related object in the vicinity of the requesting node. Other mechanisms for determining the likelihood could be used. $\varepsilon$ is a threshold level of correspondence between $ODI^A(B)$ and $ODI^{BS}(B)$ as calculated according to the global matching function G. The threshold indicates a minimum percentage match below which it is unlikely that the received ODI matches that stored in respect of any registered node. The threshold can be dynamic and may depend, for example, on network conditions and hence how up to date and accurate the stored information is. Thus by means of the above-described protocol, the BS/CVIS can decide whether or not to grant a request to establish a link. The BS/CVIS can also determine to prioritize one request over another received simultaneously. With reference to FIGS. 5 and 6, it may therefore be decided not to implement steps 7 and 8 respectively. This ability to refuse to grant resources can keep illegitimate requesting nodes out of network communication. For example, if the ODI sent by such a node has been artificially generated rather than having been genuinely generated by observation of a traffic-related node, the global matching function will likely return below the threshold.

The BS/CVIS can also prioritize requests based on other criteria. For example, with reference to signal 2 of FIGS. 5 and 6, the requesting node could also send an indication of a priority associated with a message it wishes to send to the target node. This priority could be multiplexed with the above matching function calculation or other calculation, so as to be factored in when deciding on which requests to grant and prioritize. Other criteria such as other requirements for use of the network may also be taken into account.

Figure 7:
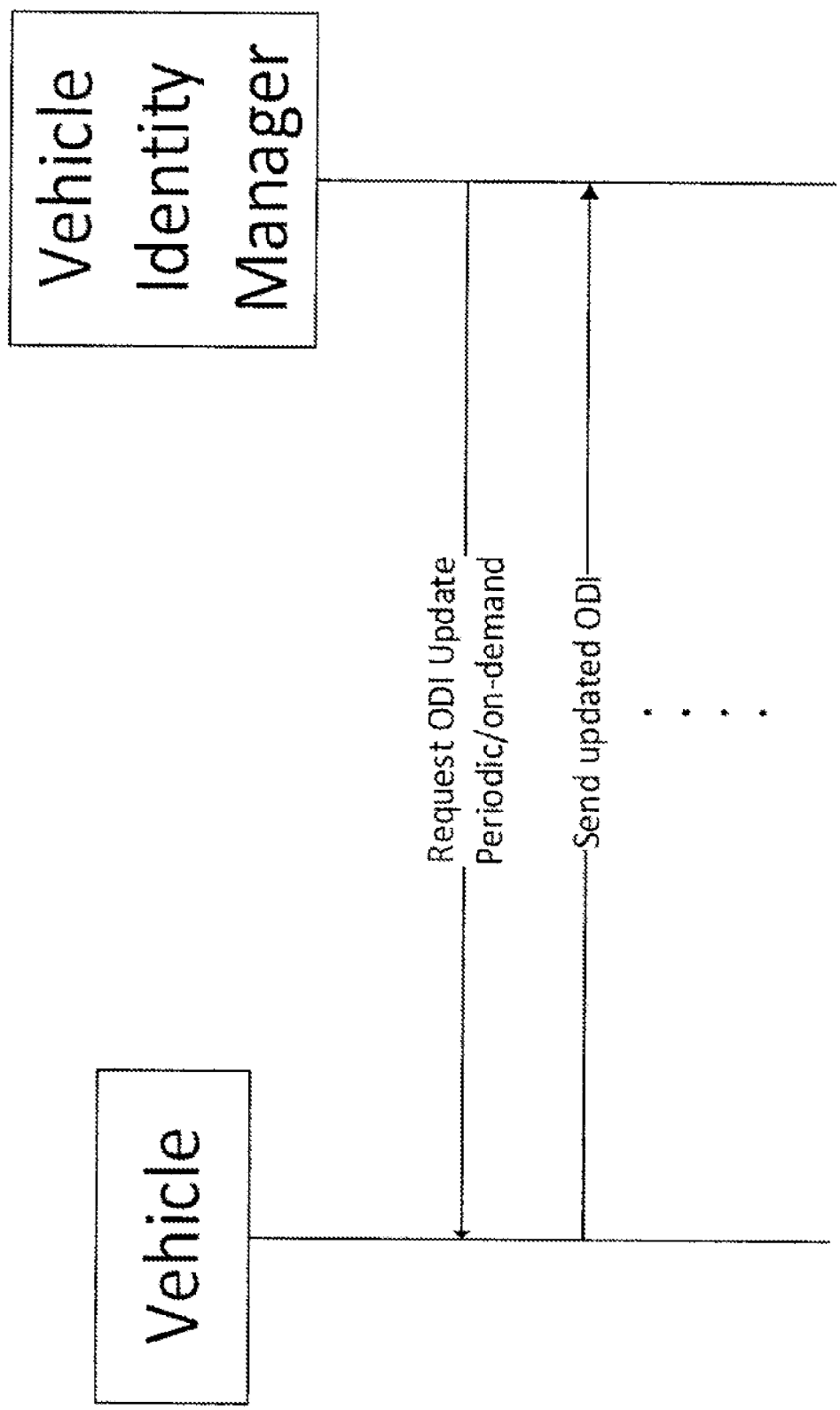
FIG. 7 shows an example of an apparatus according to one embodiment.

It will be appreciated that in order for the ODI grant matching and prioritization to be implemented accurately, the stored ODI information should be accurate. The static information is relatively straightforward to maintain, because it need only be changed when a vehicle joins or leaves the network or becomes/ceases to become active in the network, all of which happen relatively infrequently. However, the dynamic information relating to each registered node requires frequent updates as nodes move around the network cell. FIG. 7 shows a mechanism by which updates of dynamic data may be made.

A vehicle and a VIM are shown in FIG. 7 according to one embodiment. The vehicle is one of a plurality of vehicles registered with the network of which the VIM is an entity. It may be currently active i.e. communicating in the network and/or travelling within network coverage. In other examples, it may be another type of traffic node. The vehicle can be equipped with some or all of the sensors outlined in Table 1 above and is thus able to make observations on one or more other nearby traffic-related nodes. Thus it is able to generate one or more corresponding ODIs for those nodes. Even if it does not wish to use those ODIs at present, it can nonetheless send them to the VIM. The vehicle can be programmed to do this periodically or it can do so in response to a request from the VIM i.e. an on-demand request from the VIM. The VIM could decide to make a request whenever it wished, for example following a request by a requesting node to establish a communication, or if its stored data had reached a certain age.

Whilst only one vehicle is shown in FIG. 7, it will be understood that if the VIM has multiple registered nodes send ODI updates pertaining to vehicles in their respective vicinities, it may be possible to maintain the dynamic ODIs of most or all registered vehicles.

Figure 8:
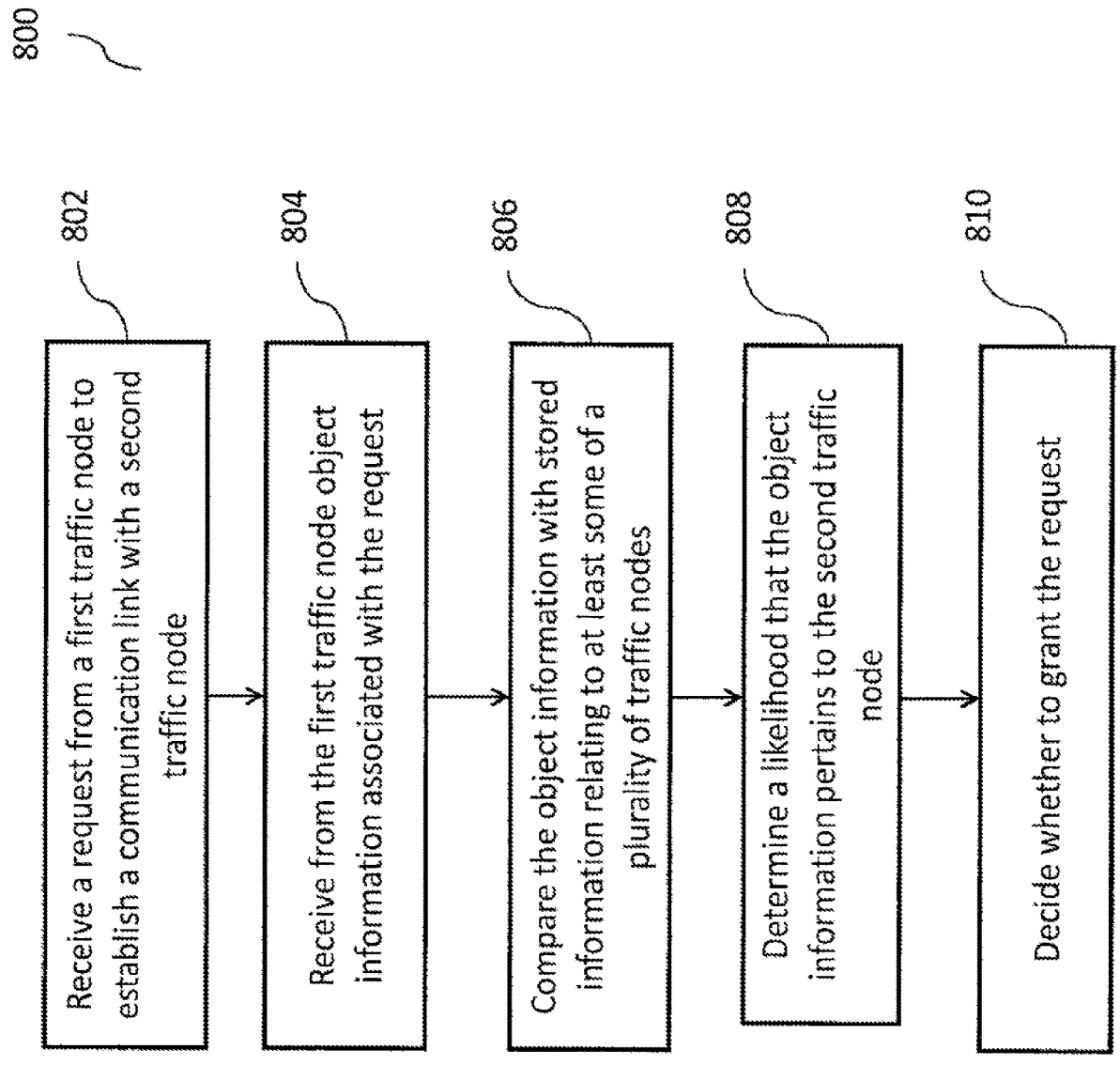
FIG. 8 shows a method according to some implementations according to one embodiment.

A basic method 800 in accordance with some implementations such as those discussed above is shown in FIG. 8 according to one embodiment. This method is applicable to many of the scenarios already discussed herein, as well as those described below with respect to FIGS. 9 and 10. It can be implemented in previously-discussed apparatus, such as a BS, CVIS or dedicated hardware fulfilling a traffic node management function.

At 802, a request is received from a first traffic node to establish a communication link with a second traffic node. This corresponds to receipt of signal 2 in FIGS. 5 & 6. The first traffic node may be any traffic-related object and may not necessarily be registered with the network in which the communication link is being requested to be set up. The first traffic node can be the requesting node in FIG. 5 or 6. The second traffic node may be any traffic-related object or group of objects that is registered with the network. It may be the target node in FIG. 5 or 6.

At 804, object information is received from the first traffic node. If the request in 802 is legitimate, this information will relate to a genuine nearby second traffic node that the first traffic node has observed and generated an ODI for.

At 806, the received object information is compared with stored information pertaining to at least some of a plurality of traffic nodes. The traffic nodes about which information is stored are registered with the network. Thus if the request is rogue, or if the second traffic node is not registered with the network, this information may not correspond to any stored information.

At 808, a likelihood that the received object information pertains to the second traffic node is determined. This may be done with reference to the result of the comparison at 806. If the request is a genuine one pertaining to the second traffic node, it may be deemed likely that the received ODI pertains to the second traffic node. If, on the other hand, the request is rogue, or if the second traffic node is not registered with the network, the comparison may have returned a low likelihood of the received ODI pertaining to the second traffic node, because it may not correspond to any stored information.

At 810, it is decided whether to grant the request to establish a communication link. As previously discussed, this decision can be based on the likelihood determined in 808. It may alternatively or additionally be based on other factors, such as whether the likelihood is above or below a threshold, a priority of a message to be sent across the requested communication link which has been notified from the first node, a comparison with other requests or other network resource considerations. One or more of these factors may be applied and may be weighted the same or differently relative to each other.

Figure 9:
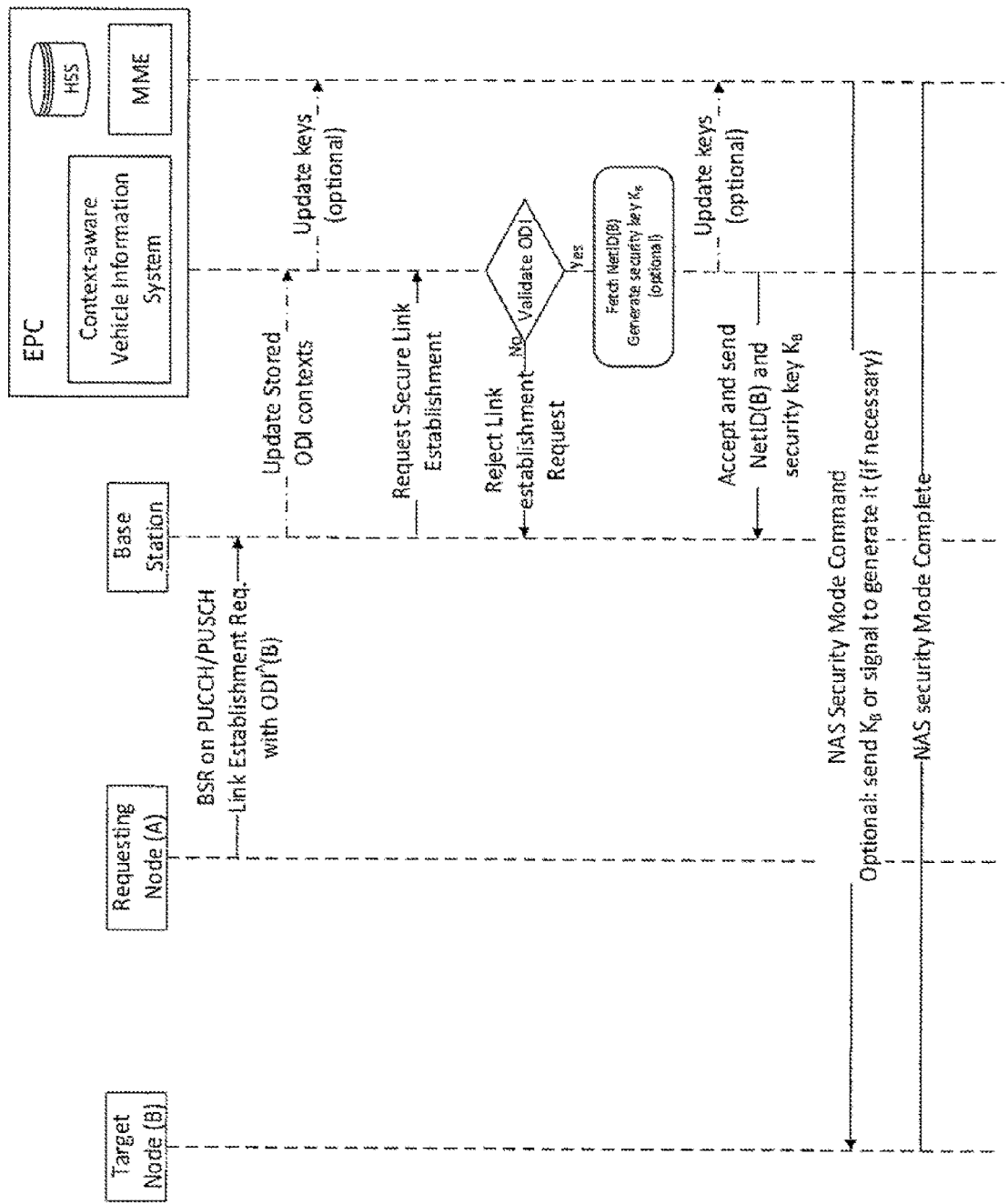
FIG. 9 shows another example of communication according to one embodiment.

FIG. 9 shows a similar scenario to those discussed above with respect to FIGS. 5 and 6 for a specific implementation according to one embodiment in the 3GPP standard Release 14. The principles of signaling described previously apply in this example, but the terminology is specific to the 3GPP standard Release 14. The signaling is described in more detail in the following.

The sidelink 'Mode-1' scheduler in the base station relies, among other inputs, on sidelink Buffer Status Reports (BSRs) from the UEs in order to schedule sidelink transmissions in the cell. The Requesting Node (A) can transmit, along with or separately from the BSRs, a scheduling or link establishment request containing the ODI of the Target Node B to the Base Station (BS). The BS forwards this received request and ODI along with its stored or updated ODIs of the nodes A and B to the Context-aware Vehicle Information System (CVIS) which, in one embodiment, is part of the core network (EPC). The CVIS may optionally update the security keys associated with the nodes A and/or B and inform the MME accordingly. The BS may explicitly request a secure link establishment from A→B to the CVIS, or the CVIS may automatically handle the request during the earlier step of updating of stored ODIs. The request is accepted or rejected based on an ODI validation function in the CVIS which matches the stored ODIs with the received ODIs as described above. If the ODI validation fails, the request is rejected and the link is not established. If the ODI validation succeeds, the network identity of Node B, for example a Sidelink-RNTI (Radio Network Temporary Identity), is queried from a database and a new security key KB is optionally generated and the MME is updated. The CVIS notifies the BS of the acceptance of link establishment and provides the associated information—network identities, security keys and degree of ODI validation/matching to assist the Sidelink scheduler in the BS to optimally allocate radio resources for the secure D2D communication from nodes A→B. The Non-Access Stratum (NAS) layer can optionally trigger the security context update procedure between the MME and Node B to update the newly generated security key KB. This step can also be done implicitly. The BS then schedules the D2D resources for the communication from A→B and signals this information in a sidelink resource grant using the DCI Format 5 to Node A. On receiving the sidelink grant, A signals the D2D transmission on the sidelink via the Sidelink Control Information (SCI) Format 0 on the PSCCH followed by the secure data transmission, encrypted by the newly generated key KB on the PSSCH.

Figure 10:
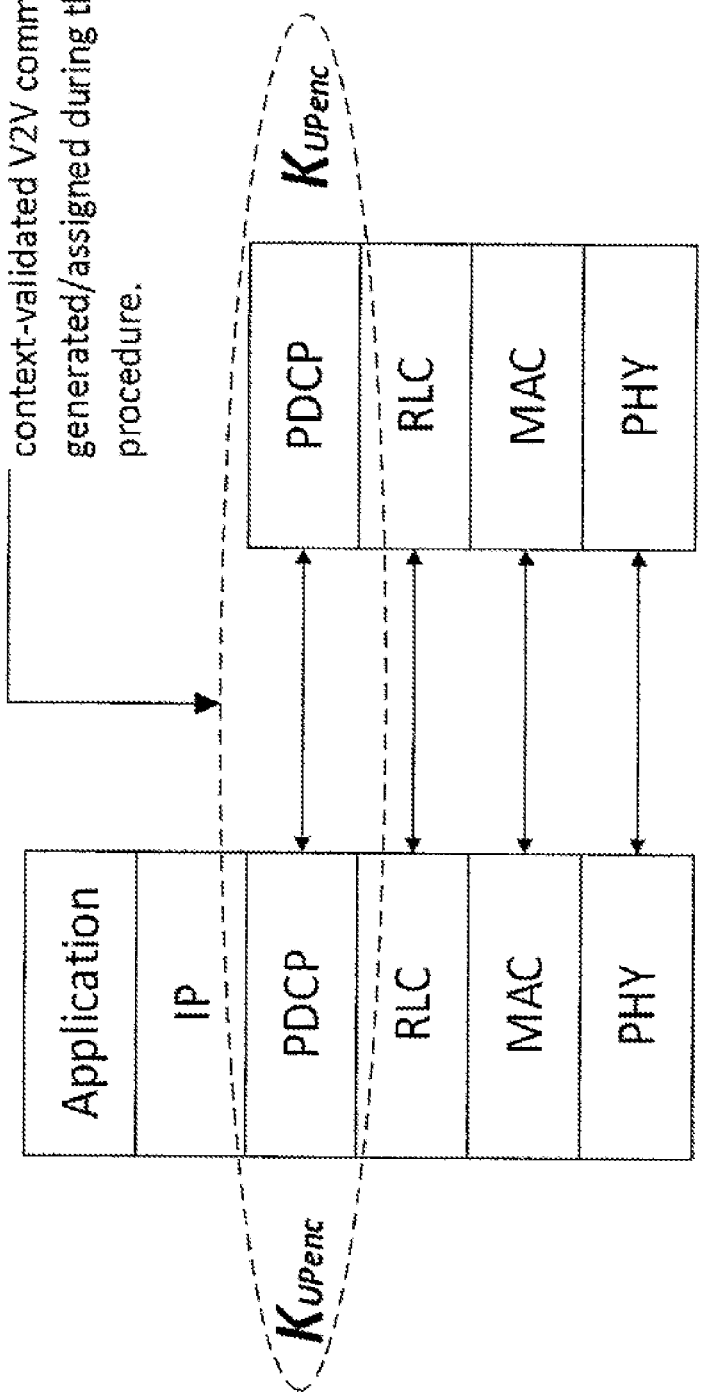
FIG. 10 shows an example of security architecture according to one embodiment.

FIG. 10 shows an LTE architecture that can be used to implement the security key generation aspects of examples described herein according to one embodiment.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An apparatus for managing communication links comprising:
   a memory storing instructions;
   a processor to execute the instructions stored in the memory to perform the following operations:
      receiving a request from a first traffic node to establish a communication link with a second traffic node, wherein at least the second traffic node is one of a plurality of traffic nodes registered with a radio network;
      receiving, from the first traffic node, object description information associated with the request, wherein the object description information is data collected by the first traffic node from the second traffic node, and identifies the second traffic node with a predetermined confidence level;
      comparing the object description information with stored information relating to the second traffic node;
      determining, based on the comparison, a likelihood that the object description information pertains to the second traffic node; and
      deciding, based on the determination, whether to grant the request.

2. The apparatus as claimed in claim 1, wherein the operations further comprise:
   deciding to grant the request if the determined likelihood is equal to or higher than a predetermined threshold.

3. The apparatus as claimed in claim 1, wherein the operations further comprise:
   receiving from each of one or more further traffic nodes, a request to establish a communication link with the second traffic node;
   receiving object description information associated with each request;
      for each request, comparing the object description information with stored information relating to the second traffic node;

determining, based on each comparison, a likelihood that the object description information associated with each request pertains to the second traffic node; and prioritizing granting of the requests based on the determined likelihoods.

4. The apparatus as claimed in claim 3, wherein the operations further comprise:

receiving from each of the one or more further traffic nodes an indication of a priority of a message to be communicated to the second traffic node via the requested communication link;

prioritizing granting of the requests based additionally on the indicated message priorities.

5. The apparatus as claimed in claim 1, wherein the apparatus is to store or access the stored information and wherein the stored information comprises:

a network identity of each of the plurality of traffic nodes;

static object description information pertaining to each of the plurality of traffic nodes; and dynamically-updated object description information received from active ones of the plurality of traffic nodes, wherein the dynamic object description information received from each active traffic node includes temporal context information obtained by the traffic node pertaining to at least some of other ones of the plurality of traffic nodes.

6. The apparatus as claimed in claim 1, wherein the operations further comprise:

granting the request by sending a security key or an indicator of a security key to the first traffic node.

7. The apparatus as claimed in claim 1, wherein the operations are to manage communication links in the radio network that permits direct communication between registered traffic nodes.

8. The apparatus as claimed in claim 1, wherein the second traffic node is a single one of the plurality of traffic nodes having a unique security key.

9. The apparatus as claimed in claim 1, wherein the second traffic node is one of the plurality of traffic nodes, each of which holds a group security key.

10. A method for managing communication links with a plurality of traffic nodes registered with a radio network, the method comprising:

receiving, at a traffic node manager, a request from a first traffic node to establish a communication link with a second traffic node, wherein at least the second traffic node is one of the plurality of traffic nodes;

receiving, at the traffic node manager, from the first traffic node object information associated with the request, wherein the object description information is data collected by the first traffic node from the second traffic node, and identifies the second traffic node with a predetermined confidence level;

comparing, by the traffic node manager, the object information with stored information relating to at least some of the plurality of traffic nodes;

determining, by the traffic node manager based on the comparison, a likelihood that the object information pertains to the second traffic node; and deciding, by the traffic node manager based on the determination, whether to grant the request.

11. A computer program product comprising non-transitory computer-readable medium storing instructions which, when executed by at least one programmable processor, cause the at least one programmable processor to perform operations to implement a method comprising:

receiving a request from a first traffic node to establish a communication link with a second traffic node, wherein at least the second traffic node is one of the plurality of traffic nodes;

receiving from the first traffic node object information associated with the request;

comparing the object information with stored information relating to the second traffic node, wherein the object description information is data collected by the first traffic node from the second traffic node, and identifies the second traffic node with a predetermined confidence level;

determining, based on the comparison, a likelihood that the object information pertains to the second traffic node; and deciding, based on the determination, whether to grant the request.

12. An apparatus connected to a first traffic node, comprising:

a memory storing instructions; and a processor to execute the instructions stored in the memory to perform the following operations:

sending to a traffic node manager of a radio network, a request to establish a communication link with a traffic node registered with the radio network;

obtaining object description information associated with the traffic node, wherein the object description information is data collected by the first traffic node from the second traffic node, and identifies the second traffic node with a predetermined confidence level;

sending the object description information to the traffic node manager;

awaiting receipt of a grant or denial of the request from the traffic node manager; and upon receipt of a grant of the request, communicating with the traffic node.

13. An apparatus connected to a second traffic node registered with a radio network, comprising:

a memory storing instructions; and a processor to execute the instructions stored in the memory to perform the following operations:

refusing establishment of a direct request to communicate received from a first traffic node if no communication link exists between the first traffic node and a second traffic node;

awaiting establishment of a secure communication link from a traffic node manager of the radio network which has received a request and object description from the first traffic node to establish a communication link with the second traffic node, wherein the object description information is data collected by the first traffic node from the second traffic node, and identifies the second traffic node with a predetermined confidence level; and upon receipt of notification of establishment of the secure communication link, communicating with the first traffic node.

14. A first traffic node, comprising:

a memory storing instructions; and a processor to execute instructions stored in the memory to perform the following operations:

sending to a traffic node manager of a radio network, a request to establish a communication link with a second traffic node registered with the radio network;

obtaining object description information associated with the second traffic node, wherein the object description information is data collected by the first traffic node from the second traffic node, and identifies the second traffic node with a predetermined confidence level;

sending the object description information to the traffic node manager;

awaiting receipt of a grant or denial of the request from the traffic node manager; and upon receipt of a grant of the request, communicating with the second traffic node.

15. A second traffic node registered with a radio network, comprising:

a memory storing instructions;

a processor to execute the instructions stored in the memory to perform the following operations:

refusing establishment of a direct request to communicate received from a first traffic node if no communication link exists between the first and second traffic nodes;

awaiting establishment of a secure communication link from a traffic node manager of the radio network which has received a request and object description from the first traffic node to establish a communication link with the second traffic node, wherein the object description information is data collected by the first traffic node from the second traffic node, and identifies the second traffic node with a predetermined confidence level; and upon receipt of notification of establishment of the secure communication link, communicating with the first traffic node.

16. The traffic node as claimed in claim 14, further comprising one or more sensors to obtain object description information pertaining to other traffic nodes, wherein the object description information includes one or more of: radio network identity; registration number; color; make; model; all or part of a vehicle identity number (VIN); geolocation; current trajectory; future trajectory; road lane; visual features; velocity; distance from traffic node; and relative position to traffic node.

17. The traffic node as claimed in claim 15, further comprising one or more sensors to obtain object description information pertaining to other traffic nodes, wherein the object description information includes one or more of: radio network identity; registration number; color; make; model; all or part of a vehicle identity number (VIN); geolocation; current trajectory; future trajectory; road lane; visual features; velocity; distance from traffic node; and relative position to traffic node.

* * * * *